(12) United States Patent
Vandeventer et al.

(10) Patent No.: US 11,816,223 B1
(45) Date of Patent: *Nov. 14, 2023

(54) APPARATUS AND METHOD FOR UPDATING CYBER SECURITY SUPPORT BASED ON REAL-TIME CHANGES

(71) Applicant: Second Sight Data Discovery, Inc., Bloomington, IN (US)

(72) Inventors: Reuben Vandeventer, Bloomington, IN (US); David Imrem, Bloomington, IN (US)

(73) Assignee: Second Sight Data Discovery, Inc., Bloomington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,900

(22) Filed: Oct. 11, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 9,930,061 | B2 | 3/2018 | Zandani |
| 10,791,137 | B2 | 9/2020 | Chawla |
| 11,140,193 | B2 | 10/2021 | Patel |
| 2019/0236661 | A1* | 8/2019 | Hogg ............... G06F 16/9537 |
| 2020/0329068 | A1* | 10/2020 | Findlay ............ H04L 63/1433 |
| 2021/0360032 | A1* | 11/2021 | Crabtree ........... G06F 16/2477 |
| 2022/0405401 | A1* | 12/2022 | McCarthy ........... G06F 21/566 |

\* cited by examiner

*Primary Examiner* — Fatoumata Traore
(74) *Attorney, Agent, or Firm* — CALDWELL INTELLECTUAL PROPERTY LAW

(57) ABSTRACT

An apparatus and method for updating cyber security support based on real time changes are provided. The apparatus includes a processor and a memory communicatively coupled to the at least a processor. The memory contains instructions configuring the at least a processor to receive a cyber profile associated with a digital environment and receive a risk profile associated with the cyber profile. Further, the memory contains instructions configuring the at least a processor analyze the cyber profile and the risk profile and calculate a cyber-attack safeguard quantifier for a cyber-attack safeguard based on the analysis of the cyber profile and risk profile. Additionally, the memory contains instructions configuring the at least a processor monitor for a digital environment variation and update the cyber-attack safeguard quantifier.

16 Claims, 7 Drawing Sheets

APPARATUS AND METHOD FOR UPDATING CYBER SECURITY SUPPORT BASED ON REAL-TIME CHANGES

FIELD OF THE INVENTION

The present invention generally relates to the field of cyber security. In particular, the present invention is directed to an apparatus and method for updating cyber security support based on real time changes.

BACKGROUND

In recent years, cyber security has become increasingly important as much of the world's information is stored digitally. Modern cyber security solutions include a wide array of variables to account for to ensure networks and highly sensitive data are secure. Sorting through the wide array of variables is time consuming and may not detect all areas that may need to be addressed. Further, it is difficult to efficiently manage and keep track of safeguards associated with cyber security. In addition, data used for the generation of the safeguards is not up to date and up to date information may affect different aspects of these safeguards. As such, modern solutions are inefficient and can be improved.

SUMMARY OF THE DISCLOSURE

In an aspect, an apparatus for updating cyber security support based on real time changes includes a processor and a memory communicatively coupled to the at least a processor. The memory contains instructions configuring the at least a processor to receive a cyber profile associated with a digital environment and receive a risk profile associated with the cyber profile. Further, the memory contains instructions configuring the at least a processor analyze the cyber profile and the risk profile and calculate a cyber-attack safeguard quantifier for a cyber-attack safeguard based on the analysis of the cyber profile and risk profile. Additionally, the memory contains instructions configuring the at least a processor to monitor for a digital environment variation and update the cyber-attack safeguard quantifier.

In another aspect, a method for updating cyber security support based on real time changes includes receiving, by a processor, a cyber profile associated with a digital environment and receiving, by the processor a risk profile associated with the cyber profile. Further, method includes analyzing, by the processor, the cyber profile and the risk profile and calculating, by the processor, a cyber-attack safeguard quantifier for a cyber-attack safeguard based on the analysis of the cyber profile and risk profile. Additionally, the method includes monitoring, by the processor, for a digital environment variation and updating, by the processor, the cyber-attack safeguard quantifier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for updating cyber security support based on real time changes. In an embodiment, a cyber-attack safeguard quantifier for a digital environment is generated using up to date information about a level of digital security for a digital environment.

Aspects of the current disclosure allow for efficient and accurate calculation and determination of cyber-attack safeguards associated with different digital environments. Exemplary embodiments illustrating aspects of the present disclosure are described below in the context of several specific examples.

Figure 1:
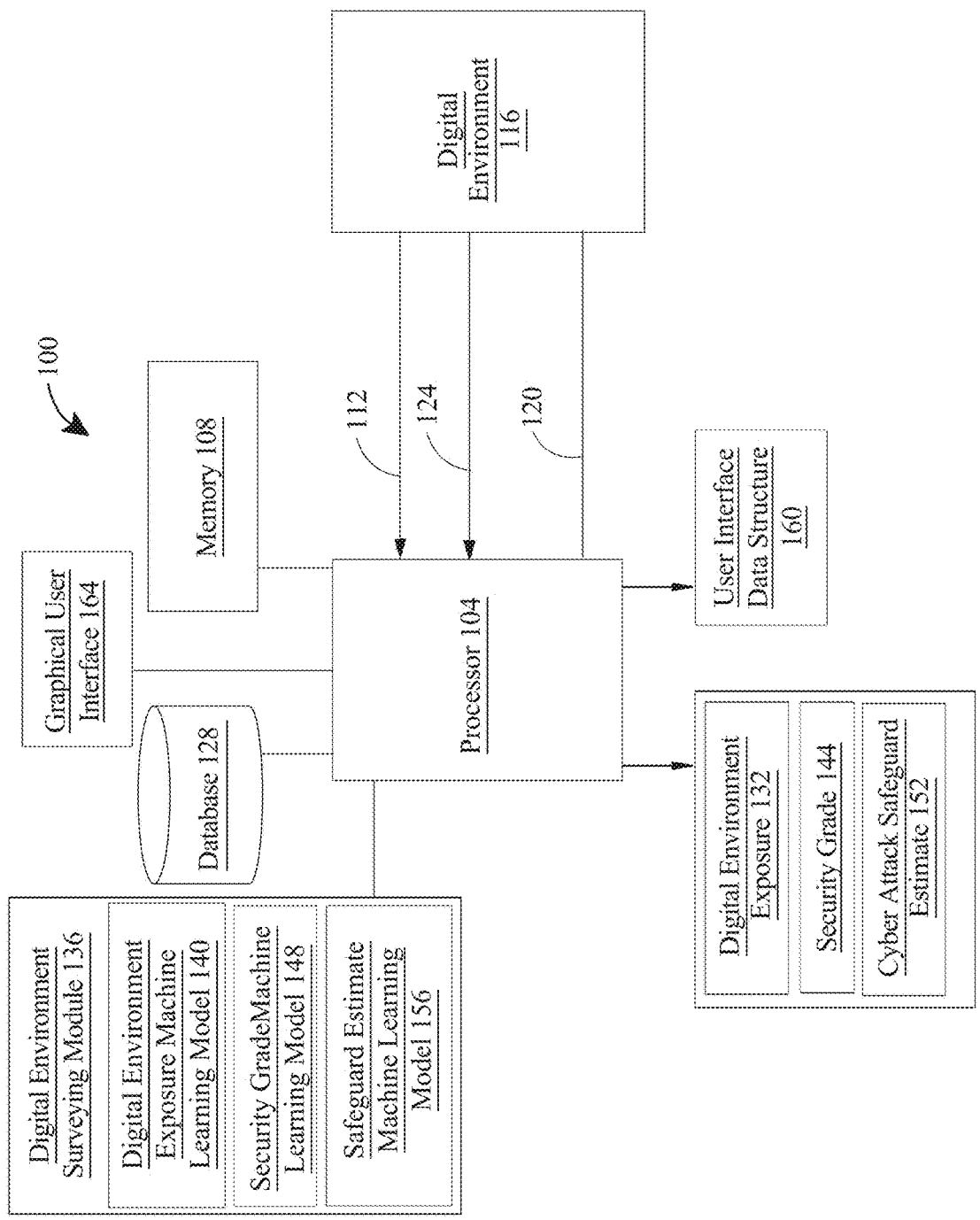
FIG. 1 is a block diagram of an apparatus for determining a risk associated with a cyber-attack.

Referring now to FIG. 1, an exemplary embodiment of an apparatus 100 for updating cyber security support based on real time changes is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to, by memory 108, perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive a cyber profile 112 from a digital environment 116. A "digital environment," for the purpose of this disclosure is an integrated communications environment where digital devices communicate and manage data and interactions within the digital environment 116. Digital device may be any computing device as described in this disclosure, for example as described in FIG. 6. For example, the digital environment 116 may be one of a computer system, computer network, and the like. In an exemplary embodiment, the digital environment 116 may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the digital environment 116 may also include any electronically based asset associated with the digital environment 116, as described in more detail below. For example, electronically based digital assets may be computer programs, data, data stores, and the like, but are not limited to such examples. The digital environment 116 may be connected to the processor 104 by a network 120, as described in more detail below.

With continued reference to FIG. 1, the cyber profile 112 may be an input into the apparatus 100. As used in this disclosure, a "cyber profile" is a collection of data and/or information about digital assets associated with the digital environment. As used in this disclosure, a "digital asset" is any electronically based asset associated with and interconnected within the digital environment 116. For example, digital assets may include servers, databases, and computing main frames for the digital environment 116. In a further exemplary embodiment, digital assets may also include computer-based programs, computer program data, and the like. Each digital asset may be connected by a communication network. The communication network 120 may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network 120 may employ a wired and/or wireless mode of communication. Further, the digital environment 116 may employ any type of network architecture. For example, the digital environment 116 may employ a peer to peer (P2P) architecture where each computing device in a computing network is connected with every computing device in the network and every computing device acts as a server for the data stored in the computing device. In a further exemplary embodiment, the digital environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment 116 may employ a mesh topology where a computing device is connected to one or multiple other computing devices using point to point connections. However, the network topology is not limited thereto. One skilled in the art will recognize the various network architectures that may be employed by the digital environment.

With further reference to FIG. 1, users may have permission to access digital assets within the digital environments. The digital assets may be accessed by users in a number of different way. For example, the digital assets may be a software as a service (SaaS, thin-client computing device, thick client computing device, and the like. In other exemplary embodiments, a user may be required to use login credentials to access the digital assets. The login in credentials may be any of login credentials at an organization level (e.g., all users for the organization use the same log in credentials) and/or individual log in credentials. One skilled in the art will recognize the various methods for user access to digital environments that may be employed by the digital environment 116. In an embodiment, at least a portion of each digital asset may also be installed on each user device associated with each user. In an exemplary embodiment, the digital assets may also be hosted on a central computing device to be accessed using user devices connected to the central server. Further, the digital environment 116 may employ one of a private network and a virtual private network (VPN) to establish a secure connection between the digital assets and the user.

For example, the cyber profile 112 may include digital profile data about the digital assets associated with the digital environment. Such digital profile data may include specification data, program data, and the like. In an exemplary embodiment, the digital profile data may include a number of computer programs used in the digital environment 116, a number of computing devices, and the like. Further, the digital profile may be associated with a risk level. For example, a larger number of computer devices may indicate an increased risk level based on more areas of exposure to cyber-attack associated with more computing devices. The cyber profile 112 may also include user data associated with the digital assets. For example, the user data may include a number of users with access to a digital asset, identities of users with access to a digital asset, a level of access the users have to the digital asset, a type of access associated with the users, and the like. In an exemplary embodiment, users with a higher level and/or type of access (e.g., access to more digital assets, higher levels of access, and/or more secure digital assets) may indicate an increased risk level based on the increased access to the digital assets. As used in this disclosure, "level of access" is a set of permissions and/or restrictions that are associated with each user associated with the digital environment 116. Further, as used in this disclosure, "type of access" is a classification for each user account and the level of access associated with each classification for users connected to the digital environment 116. In a further exemplary embodiment, users with a lower level and/or type of access (e.g., access to less digital assets, lower levels of access, and/or less secure digital assets) may indicate a decreased risk level based on the lesser access to the digital assets. Further, the cyber profile 112 may include protective asset data. As used in this disclosure, a "protective asset data" is a collection of digital data and/or information about protective measures the digital environment may have in place to protect the digital assets. For example, protective asset data may include data about anti-malware applications, firewalls, access restrictions, security protocols, and the like. In an exemplary embodiment, protective asset data associated with an increased level of protective assets (e.g., higher firewall settings, access restrictions, and the like) may indicate a decreased risk level. In a further exemplary embodiment, protective asset data associated with a decreased level of protective assets (e.g., lower firewall settings, access restrictions, and the like) may indicate an increased risk level based on the lesser access to the digital assets.

With further reference to FIG. 1, the processor is configured to receive risk profile 124 from the digital environment 116. The risk profile 124 may be an input into the apparatus 100. As used in this disclosure, "risk profile" is a collection of digital data and/or information associated with security of a digital environment 116. For example, the risk profile 124 may include categories such as cyber-attack protection data, degree of single points of failure data, cyber-attack recovery protocol data, and digital environment security grade but are not limited to such examples. One skilled in the art will recognize other categories of data that may be risk profile data 124.

Continuing to reference FIG. 1, in an embodiment, cyber-attack protection data may include a number of users with access to the digital environment, a level of access for each user, security protocols, security protocol levels, and the like. As used in this disclosure, "cyber-attack protection data" is digital data and/or information about protective measures and user restrictions implemented in the digital environment. As used in this disclosure, "degree of single points of failure data" is data indicating a level of failure associated with each digital assets in the event of a cyber-attack and/or failed operation of the digital asset. Further, the degree of single points of failure data may include impact of failure data. For example, impact of failure data may include data describing a level of failure of a digital environment based on different potential cyber-attacks and different potential points of failure in digital assets. In an embodiment, impact of failure data may include instances of when a point of failure may cause interruption on a small scale (e.g., at a department level, etc.), a medium scale (e.g., at an office level, etc.), and a large scale (e.g., at an entire company level, etc.). As used in this disclosure, "cyber-attack recovery protocol data" is data associated with the recovery of a digital environment after a potential cyber-attack. For example, cyber-attack recovery protocol data may include data about recovery protocols that may be used such as data backup information, an amount of time needed for digital assets to recover, and the like. In a non-limiting embodiment, the risk profile 124 may include a digital environment risk record. In an embodiment, the digital environment risk record may include a security grade. As used in this disclosure, the security grade may be an indication of a level of preparedness for preventing and resolving issues associated with a cyber-attack associated with the digital environment. The security grade may also be an indication of a probability of an adverse event on the digital environment (e.g., a cyber-attack or interruption to operation continuity of the digital environment). For instance and without limitation, the digital environment risk record may be consistent with digital environment risk record in U.S. patent application Ser. No. 17/963,805 and entitled, "APPARATUS AND METHOD FOR DETERMINING A RISK ASSOCIATED WITH A CYBER-ATTACK," which is incorporated by reference herein in its entirety.

With further reference to FIG. 1, the processor 104 is further configured to evaluate the cyber profile 112 and the risk profile 124. In an embodiment, the processor 104 may be configured to segment each of the cyber profile 112 and the risk profile 124 into their respective categorical data. For example, the cyber profile 112 may be segmented into digital asset profile data, user data associated with the digital assets, protective asset data, and the like. In a further example, the risk profile 124 may be segmented into cyber-attack protection data, degree of single points of failure data, cyber-attack recovery protocol data, digital environment risk record, and the like. Each of the categorical data of the cyber profile 112 and the risk profile 124 may be compared with corresponding categorical data for cyber profiles and risk profiles from digital environments separate from digital environment 116. The corresponding categorical data from other digital environments may be stored in database 128 that is communicatively connected to the processor 104. The corresponding categorical data may be associated with a specified level of cyber-security necessary to secure the associated digital environment.

Continuing to refer to FIG. 1, the processor 104 may be configured to identify at least one digital environment exposure for the digital environment 116. As used in this disclosure, "digital environment exposure" is an area of digital environment 116 that is susceptible to a cyber-attack and for which supplemental action is able to increase protection against cyber-attack. In an embodiment, the processor 104 may be configured to identify at least one digital environment exposure for the digital environment 116 based on the comparison of categorical data for the cyber profile 112 with corresponding categorical data of historical cyber profile data, cyber profile data of similar digital environments, and the like and/or categorical data for the risk profile 124 with corresponding categorical data of historical risk profile data, risk profile data of similar digital environments, and the like. For example, cyber-attack recovery protocol data for digital environment 116 may be compared to corresponding cyber-attack recovery protocol data for other digital environments and the processor 104 may detect an indication the cyber-attack recovery protocol data may require further attention to secure the digital environment 116 based on differences in the comparison of the two cyber-attack protocol data and identify the cyber-attack recovery protocol data as an digital environment exposure of the at least one digital environment exposure for the digital environment 116.

With further reference to FIG. 1, the processor 104 may be configured to identify at least one digital environment exposure 132 for the digital environment 116 based on the risk profile data 124. In an exemplary embodiment, the processor 104 may be configured to use at least one of the cyber-attack protection data, degree of single points of failure data, and cyber-attack recovery protocol data to determine the at least one digital environment exposure 132. For example, the processor 104 may be configured to compare each of the cyber-attack protection data, degree of single points of failure data, and cyber-attack recovery protocol data with corresponding cyber-attack protection data, degree of single points of failure data, and cyber-attack recovery protocol data for other digital environments and determine which of the cyber-attack protection data, degree of single points of failure data, and cyber-attack recovery protocol data may be an digital environment exposure based on the comparison, as described above. Additionally, or alternatively, the processor 104 may be configured to determine the at least one digital environment exposure 132 based on the cyber profile 112. In an exemplary embodiment, the processor 104 may be configured to use at least one of the digital profile data about the digital assets, user data associated with the digital assets, protective asset data, cyber-attack protection data, degree of single points of failure data, and cyber-attack recovery protocol data to identify at least one digital environment exposure for the digital environment 116. For example, the processor 104 may be configured to compare each of the digital asset data, protective asset data, cyber-attack protection data, cyber-attack protection data, degree of single points of failure data, and cyber-attack recovery protocol data with corresponding digital asset data, protective asset data, cyber-attack protection data, cyber-attack protection data, degree of single points of failure data, and cyber-attack recovery protocol data for separate digital environments and determine which of the digital asset data, protective asset data, cyber-attack protection data, cyber-attack protection data, degree of single points of failure data, and cyber-attack recovery protocol data may be an digital environment exposure based on the comparison, as described above.

Continuing to reference FIG. 1, the processor 104 may use a machine learning module, such as digital environment surveying module 136, to implement one or more algorithms or generate one or more machine-learning models, such as exposure machine learning model 140, to identify at least one digital environment exposure 132 for the digital environment 116. However, the machine learning module is exemplary and may not be necessary to generate the one or more machine learning models and perform any machine learning described herein. In one or more embodiments, the one or more machine-learning models may be generated using training data. Training data may include inputs and corresponding predetermined outputs so that a machine-learning model may use the correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. The exemplary inputs and outputs may come from a database, such as any database described in this disclosure, or be provided by a user such as a digital environment administrator and/or a digital security administrator. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Digital environment surveying module 136 may be used to generate exposure machine learning model 140 and/or any other machine learning model, such as security grade machine learning model 144 described below, using training data. Exposure machine learning model 140 may be trained by correlated inputs and outputs of training data. Training data may be data sets that have already been converted whether manually, by machine, or any other method. Training data may include previous outputs such that exposure machine learning model 140 iteratively produces outputs. Exposure machine learning model 140 using a machine-learning process may output converted data based on input of training data.

In an embodiment, the analyzing of the cyber profile and the risk profile may include identifying at least one digital environment exposure 132 for the digital environment 116 based on at least one of the cyber profile 112 and risk profile 124 using a machine learning model, such as exposure machine learning model 140 generated by digital environment surveying module 136. The exposure machine learning model 140 may be trained by training data, discussed in further detail below, such as exposure training data. Exposure training data may be stored in a database 128. Database 128 is discussed in further detail below.

With continued reference to FIG. 1, the identifying of the at least one digital environment exposure using a machine learning model may include receiving exposure training data. In an embodiment, the exposure training data may include a plurality of risk profile 124 data and/or cyber profile 112 data that are each correlated to one of a plurality of digital environment exposure data. As used in this disclosure, "digital environment exposure data" is data describing areas of weakness or susceptibility to cyber-attacks within computer networks, computer systems, and the like. For example, digital environment exposure data may be data indicating an area of weakness for a digital environment is connected to a number of users with unrestricted access to sensitive data, a low level of a firewall setting for the digital environment, and the like. For example, the exposure training data may be used show how risk profile data may indicate a strength or weakness in the cyber security in the digital environment. In a further embodiment, the exposure training data may also include a plurality of cyber profile data that are each correlated to one of a plurality of digital environment exposure data. In such an embodiment, the exposure training data may be used show how cyber profile data may indicate a strength or weakness in the cyber security in the digital environment. The identifying of the at least one environment exposure 132 using a machine learning model may further include training an environment exposure machine learning model as a function of the exposure training data. Further, the identifying of the at least one environment exposure 132 using a machine learning model may also include identifying of the at least one environment exposure using the trained exposure machine learning model. Alternatively, or additionally, digital environment surveying module 136 may use an exposure classifier to classify the digital asset data, user data associated with the digital assets, protective asset data, cyber-attack protection data, degree of single points of failure data, and cyber-attack recovery protocol data according to a type of digital environment exposure. For example, types of digital security deficiencies may include system misconfigurations, authorization credential weaknesses, software vulnerabilities, and the like. In an exemplary embodiment, system misconfigurations may include digital assets having vulnerable settings or disparate security controls. Authorization credential weaknesses may include accessing the digital environment using user credentials that were not protected and/or obtained through malfeasance. Software vulnerabilities may include unauthorized access to digital environment through vulnerabilities in older, unpatched software. One skilled in the art will recognize various other types of digital security deficiencies that may exist. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as exposure training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely outof-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean noun $$l = \sqrt{\sum_{i=0}^{n} a_i^2}$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Exposure classifier may classify cyber profile data and risk profile to one or more types and/or category of resulting cyber-attack, which may include any type of cyber-attack, sub-categories and/or more specific categories, or the like. For instance, exposure classifier may receive cyber profile data and/or risk profile data with resulting cyber-attacks that occurred and may classify according to type of cyber-attack such as malware, denial-of-service, or the like. Exposure classifier may be trained using training data correlating cyber profile data and risk profiles in digital environments to a type of cyber-attack.

With further reference to FIG. 1, the processor 104 may be configured to calculate a security grade 144 based on the cyber profile 112 and the risk profile 124. The security grade 144 may be an indication of a probability of an adverse event on the digital environment (e.g., a cyber-attack or interruption to operation continuity of the digital environment). Additionally, or alternatively, the security grade 144 may be an indication of severity of in the event of a cyber-attack and/or preparedness for cyber-attack for the digital environment 116. In an embodiment, the security grade 144 may include a ranking out of five stars, out of a scale of 1-10, a percentage score, and the like. For example, a digital environment with a security grade of "41" may be an indication the digital environment has an increased exposure to a cyber-attack than a digital environment with a security grade of "93". Alternatively, or additionally, the security grade 148 may be an alphabetic score, such as, but not limited to, "A+", "A", "A−", "B+", "B", "B−", C+", "C", "C−", "D", "D−", "F", and the like. In such an embodiment, a digital environment with a security grade of "C−" may be an indication the digital environment has an increased exposure to a cyber-attack compared to a digital environment with a security grade of "B+."

With continued reference to FIG. 1, in an embodiment, the security grade 144 may be calculated as a function of at least one of the cyber profile 112 and risk profile 124 using a machine learning model, discussed in further detail below and in FIG. 4, such as security grade machine learning model 148 generated by the digital environment surveying module 136. The security grade machine learning model 148 may be trained by training data, discussed in further detail in FIG. 4, such as security grade training data. Security grade training data may be stored in a database 128. Database 128 is discussed in further detail below.

With continued reference to FIG. 1, the calculating of the security grade 144 using a machine learning model may include receiving security grade training data from the database 128. In an embodiment, the security grade training data may include a plurality of risk profile data that are each correlated to one of a plurality of security grade data. As used in this disclosure, "security grade data" is data associating historical security grades with different pieces of risk profile data. For example, security grade data may be calculated historical data quantifying an area of weakness for a digital environment such as a number of users with unrestricted access to sensitive data, a low level of a firewall setting for the digital environment, and the like to a security grade that may be stored in database 128. In a further embodiment, the security grade training data may also include a plurality of cyber profile data that are each correlated to one of a plurality of security grade data. The determining of the security grade using a machine learning model may further include training a security grade machine learning model 148 as a function of the security grade training data. Further, the determining of the security grade using a machine learning model may also include determining of the security grade using the trained security grade machine learning model. Alternatively, or additionally, a fuzzy inferencing system for determination of digital environment security grade may be employed, where any or all digital environment security grades may be represented as values and/or fuzzy sets for linguistic variables measuring the same. An inferencing system may use one or more fuzzy inferencing rules, as described below in FIG. 5, to output one or more linguistic variable values and/or defuzzified values indicating security grade overall or according to categories.

Still referring to FIG. 1, the processor 104 may be configured to determine a cyber profile category security grade for each category of the cyber profile. Additionally, or alternatively, the processor 104 may be configured to determine the cyber profile category security grade for each category of the cyber profile using the security grade machine learning model 148 generated by the digital environment surveying module 136. As used in this disclosure, "cyber profile category security grade" is an indication of a level of preparedness for preventing and resolving issues associated with a cyber-attack associated with a specific category of cyber profile data. The determined cyber profile category security grade may also be an indication of a probability of an adverse event on the digital environment associated with the specific category of cyber profile data. In an embodiment, the categories of the cyber profile may be digital asset data, user data associated with the digital assets, and protective asset data, as described above, and the processor 104 may be configured to determine a cyber profile category security grade for the digital asset profiled data, user data associated with the digital assets, and protective asset data using the security grade machine learning model 148. However, the processor 104 may be configured to determine a cyber profile category security grade for any category of data associated with the cyber profile. The processor 104 may be configured to receive cyber profile category security grade training data that correlates a plurality of cyber profile category data to each of a plurality of cyber profile category security grades, train the security grade machine learning model 148 as a function of the cyber profile category security grade training data, and determines a cyber profile category security grade for each category of the cyber profile using the trained security grade machine learning model 148. In an embodiment, the security grade machine learning model 148 may be trained using cyber profile category security grade training data to determine a relationship between an input of a plurality of cyber profile category data to calculate an output of a cyber profile category security grade.

Continuing to refer to FIG. 1, the processor 104 may be configured to determine a risk profile category security grade for each category of the risk profile. Additionally, or alternatively, the processor 104 may be configured to determine the risk profile category security grade for each category of the risk assessment category data using the security grade machine learning model 148. As used in this disclosure, "risk profile category security grade" is an indication of a level of preparedness for preventing and resolving issues associated with a cyber-attack associated with a specific category of risk profile 124. The determined risk profile category security grade may also be an indication of a probability of and identification of an exposure that may lead to an adverse event on the digital environment associated with the specific category of risk profile 124. In an embodiment, the categories of the risk profile category data may be cyber-attack protection data, degree of single points of failure data, and cyber-attack recovery protocol data, as described above, and the processor 104 may be configured to determine a risk profile category security grade for the cyber-attack protection data, degree of single points of failure data, and cyber-attack recovery protocol data using the security grade machine learning model 148. However, the processor 104 may be configured to determine a risk profile category security grade for any category of data associated with the risk profile category data. In an exemplary embodiment, for cyber-attack protection data, training data indicating a greater level of protection (e.g., higher firewall settings, limited user access, and the like) may be correlated to a higher risk assessment category security grade. Further, training data indicating a lesser level of protection (e.g., lower firewall settings, greater user access, and the like) may be correlated to a lower risk profile category security grade (e.g., lower numerical and/or alphabetic grade). In a further exemplary embodiment, training data indicating a greater single point of failure (e.g., a larger portion of digital environment would lose functionality in a cyber-attack) may be correlated with a lower risk profile category security grade. Further, training data indicating a lesser single point of failure (e.g., a smaller portion of digital environment would lose functionality) may be correlated with a higher risk profile category security grade. In another further exemplary embodiment, training data indicating implementation of greater cyber-attack recovery protocols (e.g., data is backed up and can be recovered quickly, and the like) may be correlated with a greater risk profile category security grade (e.g., higher numeric and/or alphabetic score). Further, training data indicating implementation of lower levels cyber-attack recovery protocols (e.g., data is not backed up and can be recovered quickly, and the like) may be correlated with a lower risk profile category security grade.

With continued reference to FIG. 1, the processor 104 may be configured to receive risk profile category security grade training data that correlates a plurality of risk profile category data to a corresponding risk profile category security grade of a plurality of risk profile category security grades, train the security grade machine learning model as a function of the risk profile category security grade training data, and determine a risk profile category security grade for each category of the risk profile using the trained security grade machine learning model 144. In an embodiment, the security grade machine learning model 144 may be trained using risk profile category security grade training data to determine a relationship between an input of a plurality of risk profile category data to calculate an output of risk profile category security grade.

Still referring to FIG. 1, in an embodiment, each cyber profile category security grade and risk profile category security grade may be a fuzzy set and/or a value of linguistic variables. "Linguistic variables" may, in a non-limiting example, cover input value factors and the "defuzzified" output may represent a score or output indicating how likely a cyber-attack is or, via a functional output or threshold comparison, be used to make a determination of a cyber profile category security grade and/or risk assessment category security grade. Linguistic variables may represent, for instance, degree of protective asset data, single point of failure data, or any other variable that may affect a probability of successful prevention of a cyber-attack. Combinations of input variables and/or member functions may be linked to and/or composed with output membership functions and/or functional output formulas such as TSK functions to generate a defuzzified probability of success, and/or score to be compared to a threshold. Any parameters, biases, weights or coefficients of membership functions may be tuned and/or trained using machine-learning algorithms as described in this disclosure. Fuzzy inferencing and logic is further described herein with reference to FIG. 5.

With further reference to FIG. 1, the processor 104 may be configured to calculate a cyber-attack safeguard quantifier 152 for a cyber-attack safeguard. As used in this disclosure, "cyber-attack safeguard quantifier" is a quantification of impact of a cyber-attack on a digital environment. In an exemplary embodiment, cyber-attack safeguard quantifier may include a cost associated with recovery from a cyber-attack, a number of hours of lost productivity for digital environment, cost of lost assets from the cyber-attack, and the like. "Cyber-attack safeguard" as used in this disclosure is an agreement between two parties for one party to protect and cover a digital environment belonging to the other party. The processor 104 may be configured to calculate the cyber-attack safeguard quantifier 152 based on and using the analysis of the cyber profile and risk profile. In an embodiment, the cyber-attack safeguard quantifier 152 may be calculated using at least one of the at least one environment exposure 132, the security grade 144, cyber profile category security grades, risk profile category security grades, and the like as inputs. Additionally, or alternatively, the processor 104 may be configured to calculate the cyber-attack safeguard quantifier 152 using a machine learning model, such as safeguard quantifier machine learning model 156. The processor 104 may be configured to receive safeguard quantifier training data that correlates a plurality of risk profile data and/or cyber profile data to a corresponding historical safeguard quantifier of a plurality of safeguard quantifiers to determine a relationship between the input cyber profile and risk profile and a cyber-attack safeguard quantifier, train the safeguard quantifier machine learning model as a function of the safeguard quantifier training data, and determine a safeguard quantifier for digital environment using the trained safeguard quantifier machine learning model 156.

Still referring to FIG. 1, cyber-attack safeguard quantifier may be calculated based on various factors from and relationships between the cyber profile 112 and the risk profile 124. In an embodiment, the cyber-attack safeguard quantifier may be calculated based on a frequency of use of digital assets and a number of users who use the digital asset. In such an embodiment, an increased frequency of use and greater number of users may expose the digital environment 116 to increased vulnerability to cyber-attack and the cyber-attack safeguard quantifier may be calculated to reflect the increased exposure to cyber-attack. In a further exemplary embodiment, the cyber-attack safeguard quantifier may be calculated, additionally, or alternatively, based on a digital asset significance factor. As used in this disclosure, "digital asset significance factor" is an indicator of a degree of integration of a digital assets in operations conducted in digital environment. A higher digital asset significance factor may be associated with a greater degree of single point of failure data for such a digital asset. Accordingly, higher digital asset significance factor and/or greater degree of single point of failure data may be associated with an increased cyber-attack vulnerability and an increased cyber-attack safeguard quantifier. The processor 104 may be configured to determine if a digital environment variation changes cyber-attack vulnerability for digital environment. For example, higher digital asset significance factor and/or greater degree of single point of failure data may be associated with an increased cyber-attack vulnerability. Determining if a digital environment variation changes cyber-attack vulnerability may be based on one digital environment exposure and/or security grade, as described herein. In an embodiment, cyber-attack safeguard quantifier may be calculated using a plurality of machine learning models. Each machine learning model may be configured to calculate a component of cyber-attack safeguard quantifier. For example, digital environment surveying module 136 may be configured to generate at least one machine learning model configured to survey each of the digital asset profile data, user data, protective asset data, degree of single points of failure data, cyber-attack recovery protocol data, and the like and calculate a component for cyber-attack safeguard quantifier 152.

With continued reference to FIG. 1, a processor 104 may calculate a cyber-attack safeguard quantifier 152 using a lookup table. A "lookup table," for the purposes of this disclosure, is an array of data that maps input values to output values. A lookup table may be used to replace a runtime computation with an array indexing operation. In another non limiting example, a cyber-attack protection quote look up table may be able to relate any of the cyber profile and/or risk profile to a cyber-attack safeguard quantifier 152. A cyber-attack safeguard quantifier 152 lookup table may relate the at least one environment exposure, and/or security grade to a cyber-attack protection quote 152. Processor 104 may be configured to "lookup" one or more cyber profile data, risk profile data, environment vulnerabilities, security grades and the like, in order to find a corresponding cyber-attack safeguard quantifier 152.

Continuing to reference FIG. 1, the processor 104 may be configured to monitor for a digital environment variation in the digital environment. For example, the processor 104 may configured to monitor for any change and/or modification to digital assets, protective assets, and the like for digital environment 116. According to an embodiment, the digital environment variation may include at least one of at least one cyber profile variation and/or at least one risk profile variation. In an embodiment, the processor 104 may be configured to monitor for at least one cyber profile variation. As used in this disclosure, "cyber profile variation" is any change to the digital environment that may affect a change to any category of data of the cyber profile 112, such as digital asset profile data, user data associated with the digital assets, protective asset data, and the digital security of the digital environment. For example, the cyber profile variation can be increasing a level of a firewall in the digital environment 116 and the protective asset data may also change to reflect the increased level of the firewall. In an embodiment, the processor 104 may be configured to monitor for any cyber profile variation for any category of cyber profile. For example, the cyber profile variation may be any of a digital asset variation, user variation, and/or protective asset variation. As used in this disclosure, "digital asset variation" is any change to digital assets within digital environments. Some exemplary digital asset variations may be adding additional hardware, removing software programs used within the digital environment, and the like. As used in this disclosure, "user variation" is any change to user access within the digital environment. For example, user variation may be changing levels of access for certain users, changing type of access for user accounts, and the like. As used in this disclosure, "protective asset variation" is any change to protective assets within the digital environment. For example, the protective asset variation may be any of increase a firewall setting, installing a new security software, and the like.

With further reference to FIG. 1, additionally, or alternatively, the processor 104 may also be configured to monitor for at least one risk profile variation. As used in this disclosure, "risk profile variation" is any change to the digital environment that may affect a change to any category of data of the risk profile 124, such as cyber-attack protection data, degree of single points of failure data, and cyber-attack recovery protocol data, and the digital security of the digital environment. For example, the risk profile variation can be backing up additional amounts of data in the digital environment 116 and the cyber-attack recovery protocol data may also change to reflect the increased level of backed up data that can be used to recover from a cyber-attack. In an embodiment, the processor 104 may be configured to monitor for any risk profile variation for any category of risk profile. For example, the risk profile variation may be any of a cyber-attack protection variation, degree of single points of failure variation, and cyber-attack recovery protocol variation. As used in this disclosure, "cyber-attack protection variation" is any change to security measures in place for digital environment 116 to prevent a cyber-attack. Some exemplary cyber-attack protection variations may be change security protocols, increase steps for user authentication, and the like. As used in this disclosure, "degree of single points of failure variation" is any change to a level of failure associated with digital assets in the event of a cyber-attack and/or failed operation of the digital asset. For example, degree of single points of failure variation may be limiting an effect of the failure of specific digital assets, and the like. As used in this disclosure, "cyber-attack recovery protocol variation" is any change to recovery measures in place that may be used for digital environment 116 to recover in the event of a cyber-attack. For example, the cyber-attack recovery protocol variation may be any of increasing data back up to prevent a need to recover lost data and the like.

Still referring to FIG. 1, the processor 104 may be configured to detect a digital environment variation in the digital environment 116. In an embodiment, the processor 104 may be configured to detect the variation in the digital environment 116. As described above, the variation in the digital environment 116 may include at least one of at least one cyber profile variation and/or at least one risk profile variation. In an embodiment, the processor 104 may be configured to detect a variation in the digital environment 116 in real time. As used in this disclosure, "real time" is processing input data within milliseconds so that it is available immediately as feedback. Additionally, or alternatively, the processor 104 may be configured to detect a variation in the digital environment 116 that is detected as a result of an action and/or variation implemented in the digital environment. For example, such actions or variations may include increasing amount of data backup, decreasing firewall settings, adding digital assets, and the like.

Continuing to reference FIG. 1, the processor 104 may also be configured to generate modified cyber profile category data and/or modified risk profile category data. In an embodiment, the cyber profile category data and/or risk profile category may be updated to reflect a variation in digital environment 116. Further, the modified cyber profile category data and/or risk profile category data may be generated based on the cyber profile variation and/or risk profile variation to a corresponding cyber profile category and/or risk profile category. For example, when the processor detects a protective asset variation, the processor 104 may be configured to generate modified protective asset data based on the detected protective asset variation. However, the processor 104 may be configured to generate any modified cyber profile category data and risk profile category data for any cyber profile category data and any risk profile category data based on the detected cyber profile variation and/or risk profile variation.

With further reference to FIG. 1, the processor 104 may be configured to automatedly update the security grade 144 based on the detected cyber profile modification. Further, additionally, or alternatively, the processor 104 may be configured to automatedly update the security grade based on the modified cyber profile category data based on the detected cyber profile modification. In an embodiment, the security grade 144 may be increased or decreased based on the effect of the cyber profile modification on the digital security for digital environment 116. For example, the processor 104 may be configured to update the security grade 144 to a higher security grade for a cyber profile modification that increases a firewall level setting for digital environment 116. In a further example, the processor 104 may be configured to update the security grade 144 to a lower security grade for a cyber profile modification that decreases access restrictions to sensitive data for digital environment 116.

Still referring to FIG. 1, additionally, or alternatively, the processor 104 may be configured to automatedly update the security grade 144 based on the detected risk profile modification. Further, additionally, or alternatively, the processor 104 may be configured to automatedly update the security grade based on the modified risk profile category data based on the detected risk profile modification. In an embodiment, the security grade 144 may be increased or decreased based on the effect of the risk profile modification on the digital security for digital environment 116. For example, the processor 104 may be configured to update the security grade 144 to a higher security grade for a risk profile modification that increases which data is backed up for digital environment 116. In a further example, the processor 104 may be configured to update the security grade 144 to a lower security grade for a risk profile modification that causes a greater amount of failure associated with a single point of digital environment 116.

Continuing to reference FIG. 1, in an embodiment, the security grade 144 may be automatedly updated using the security grade machine learning model 148 generated by the digital environment analysis module 136. The security grade 144 may be automatedly updated using the security grade machine learning model 148 based on the detected modified cyber profile category data and/or modified risk profile category data as inputs. The security grade machine learning model 148 may be trained by training data, such as security grade training data described above. Security grade training data may be stored in a database 128. Database 128 is discussed in further detail below.

Still referring to FIG. 1, the processor 104 may be configured to update the cyber profile category security grade for each category of the cyber profile based on the detected cyber profile modification and/or modified cyber profile category data. For example, the processor may be configured to update a cyber profile category security grade for digital assets when a digital asset modification is detected. Additionally, or alternatively, the processor 104 may be configured to automatedly update the cyber profile category security grade for each category of the cyber profile using the security grade machine learning model 148. The processor 104 may be configured to update the cyber profile category security grade using the security grade machine learning model 148 trained by the cyber profile category security grade training data. Further, the processor 104 may be configured to update a cyber profile category security grade for any category of data associated with the cyber profile.

Still referring to FIG. 1, the processor 104 may be configured to update the risk profile category security grade for each category of the risk profile 124 based on the detected risk profile modification and/or modified risk profile category data. For example, the processor may be configured to update a risk profile category security grade for cyber-attack recovery protocols when a cyber-attack recovery protocol modification is detected. Additionally, or alternatively, the processor 104 may be configured to automatedly update the risk profile category security grade for each category of the risk profile using the security grade machine learning model 148. The processor 104 may be configured to update the risk profile category security grade using the security grade machine learning model 148 trained by risk profile category security grade training data. Further, the processor 104 may be configured to determine a risk profile category security grade for any category of data associated with the risk profile.

With further reference to FIG. 1, the processor 104 may be configured to automatedly update the at least one digital environment exposure 132 based on the detected cyber profile modification and/or modified cyber profile category data. In an embodiment, the at least one digital environment exposure 132 may be changed to another identified digital environment of the at least one digital environment exposure 132 based on the effect of the cyber profile modification on the digital security for digital environment 116. For example, the processor 104 may be configured to update at least one digital environment exposure 132 to needing to address user account restrictions for a cyber profile modification that increases a firewall level setting for digital environment 116.

Still referring to FIG. 1, additionally, or alternatively, the processor 104 may be configured to automatedly update the at least one digital environment exposure 132 based on the detected risk profile modification and/or modified risk profile category data. In an embodiment, at least one digital environment exposure 132 may be changed to another identified digital environment exposure of the at least one digital environment exposure 132 based on the effect of the cyber profile modification on the digital security for digital environment 116. For example, the processor 104 may be configured to update at least one digital environment exposure 132 to needing to address user account restrictions for a risk profile modification that increases data that is backed up for digital environment 116.

Continuing to reference FIG. 1, in an embodiment, the at least one digital environment exposure 132 may be automatedly updated using the security exposure machine learning model 140 generated by the digital environment analysis module 136. The security exposure machine learning model 140 may be trained by training data, such as security exposure training data described above. Security exposure training data may be stored in a database 128. Database 128 is discussed in further detail below.

Still referring to FIG. 1, the processor 104 may be configured to update the cyber profile category digital security exposure for each category of the cyber profile based on the detected cyber profile modification. For example, the processor may be configured to update a cyber profile category digital security exposure for digital assets when a digital asset modification is detected. Additionally, or alternatively, the processor 104 may be configured to automatedly update the cyber profile category digital security exposure for each category of the cyber profile using the security exposure machine learning model 140. The processor 104 may be configured to update the cyber profile category digital security exposure using the security exposure machine learning model 1480 trained by the cyber profile category digital security exposure training data. Further, the processor 104 may be configured to update a cyber profile category digital security exposure for any category of the cyber profile.

Still referring to FIG. 1, the processor 104 may be configured to update the risk profile category digital security exposure for each category of the risk profile 124 based on the detected risk profile modification. For example, the processor may be configured to update a risk profile category digital security exposure for cyber-attack recovery protocols when a cyber-attack recovery protocol modification is detected. Additionally, or alternatively, the processor 104 may be configured to automatedly update the risk profile category digital security exposure for each category of the risk profile using the digital security exposure machine learning model 140. The processor 104 may be configured to update the risk profile category digital security exposure using the digital security exposure machine learning model 140 trained by risk profile category digital security exposure training data. Further, the processor 104 may be configured to determine a risk profile category digital security exposure for any category of the risk profile.

With further reference to FIG. 1, the processor 104 may be configured to recalculate the cyber-attack safeguard quantifier 152. In an embodiment, the cyber-attack safeguard quantifier 152 may be recalculated using at least one of the updated at least one digital environment exposure 132, the updated security grade 144, updated cyber profile category security grades, updated risk profile category security grades, and the like as inputs. Additionally, or alternatively, the processor 104 may be configured to recalculate the cyber-attack safeguard quantifier 152 based on the modified cyber profile category data and/or modified risk profile category data. Additionally, or alternatively, the processor 104 may be configured to recalculate the cyber-attack safeguard quantifier 152 using a machine learning model, such as safeguard quantifier machine learning model 156. The processor 104 may be configured to receive safeguard quantifier training data that correlates a plurality of risk profile data, cyber profile data, environment exposures, security grades, and the like to a corresponding historical safeguard quantifier of a plurality of safeguard quantifiers to determine a relationship between the input cyber profile and risk profile and a cyber-attack safeguard quantifier, train the safeguard quantifier machine learning model 156 as a function of the safeguard quantifier training data, and determine a safeguard quantifier for digital environment using the trained safeguard quantifier machine learning model 156.

With continued reference to FIG. 1, a processor 104 may recalculate a cyber-attack safeguard quantifier 152 using a lookup table. As described above, a lookup table may be used to replace a runtime computation with an array indexing operation. In another non limiting example, a cyber-attack safeguard quantifier 152 lookup table may be able to relate any of the updated risk profile data, cyber profile data, environment exposures, security grades, and the like to a cyber-attack safeguard quantifier 152. Further, the cyber-attack safeguard quantifier lookup table may relate the updated at least one environment exposure, and/or updated security grade to a cyber-attack safeguard quantifier 152. Processor 104 may be configured to "lookup" one or more updated cyber profile data, updated risk profile data, updated environment exposures, updated security grades and the like, in order to find a corresponding cyber-attack safeguard quantifier 152.

With continued reference to FIG. 1, the processor 104 may be configured to generate a user interface data structure 160 configured to display the at least one digital environment exposure 132 and the security grade 144. Additionally, or alternatively, the processor 104 may be configured to generate the user interface data structure 160 to display any combination of the at least one digital security deficiency 132, cyber profile category digital security deficiency, risk profile category digital security deficiency, the security score 144, cyber profile category security score, risk profile category security score, and cyber-attack safeguard quantifier. The user interface data structure 160 may allow any of the at least one digital security deficiency 132, cyber profile category digital security deficiency, risk profile category digital security deficiency, the security score 144, cyber profile category security score, risk profile category security score, and cyber-attack safeguard quantifier to be displayed on a display, graphical user interface, and the like. Each of the at least one digital security deficiency 132, cyber profile category digital security deficiency, risk profile category digital security deficiency, the security score 144, cyber profile category security score, and risk profile category security score may be reviewed by a network administrator and/or any other associated users to review information about the digital environment 116. Additionally, or alternatively, the processor 104 may be configured to generate a user interface data structure 160 configured to display any combination of the updated at least one digital security deficiency 132, cyber profile category digital security deficiency, risk profile category digital security deficiency, the security score 144, cyber profile category security score, and risk profile category security score.

Continuing to refer to FIG. 1, the processor 104 is connected to a graphical user interface (GUI) 164 configured to display any information from apparatus 100 and/or any computing device. As used in the current disclosure, a "graphical user interface" may include a plurality of lines, images, symbols. The GUI 164 may be configured to be displayed on, without limitation, a display; the display may include any display as described in the entirety of this disclosure such as a light emitting diode (LED) screen, liquid crystal display (LCD), organic LED, cathode ray tube (CRT), touch screen, or any combination thereof.

With further reference to FIG. 1, the GUI 164 may be configured to receive the user interface data structure for any combination of the at least one digital environment exposure 132, cyber profile category digital environment exposure, risk profile category digital environment exposure, the security grade 144, cyber profile category security grade, risk profile category security grade, the updated at least one digital environment exposure 132, updated cyber profile category digital environment exposure, updated risk profile category digital environment exposure, the updated security grade 144, the updated cyber profile category security grade, and the updated risk profile category security grade. Additionally, or alternatively, the GUI 164 may be configured to display the at least one digital environment exposure 132, cyber profile category digital environment exposure, risk profile category digital environment exposure, the security grade 144, cyber profile category security grade, risk profile category security grade, the updated at least one digital environment exposure 132, updated cyber profile category digital environment exposure, updated risk profile category digital environment exposure, the updated security grade 144, the updated cyber profile category security grade, and the updated risk profile category security grade as a function of the user interface data structure for review by a user, network administrator for the digital environment, and any other decision makers for the digital environment to gather up-to-date information about potential security solutions for the digital environment 116 that may need to be addressed to prevent and/or minimize the effects of a cyber-attack.

Figure 2:
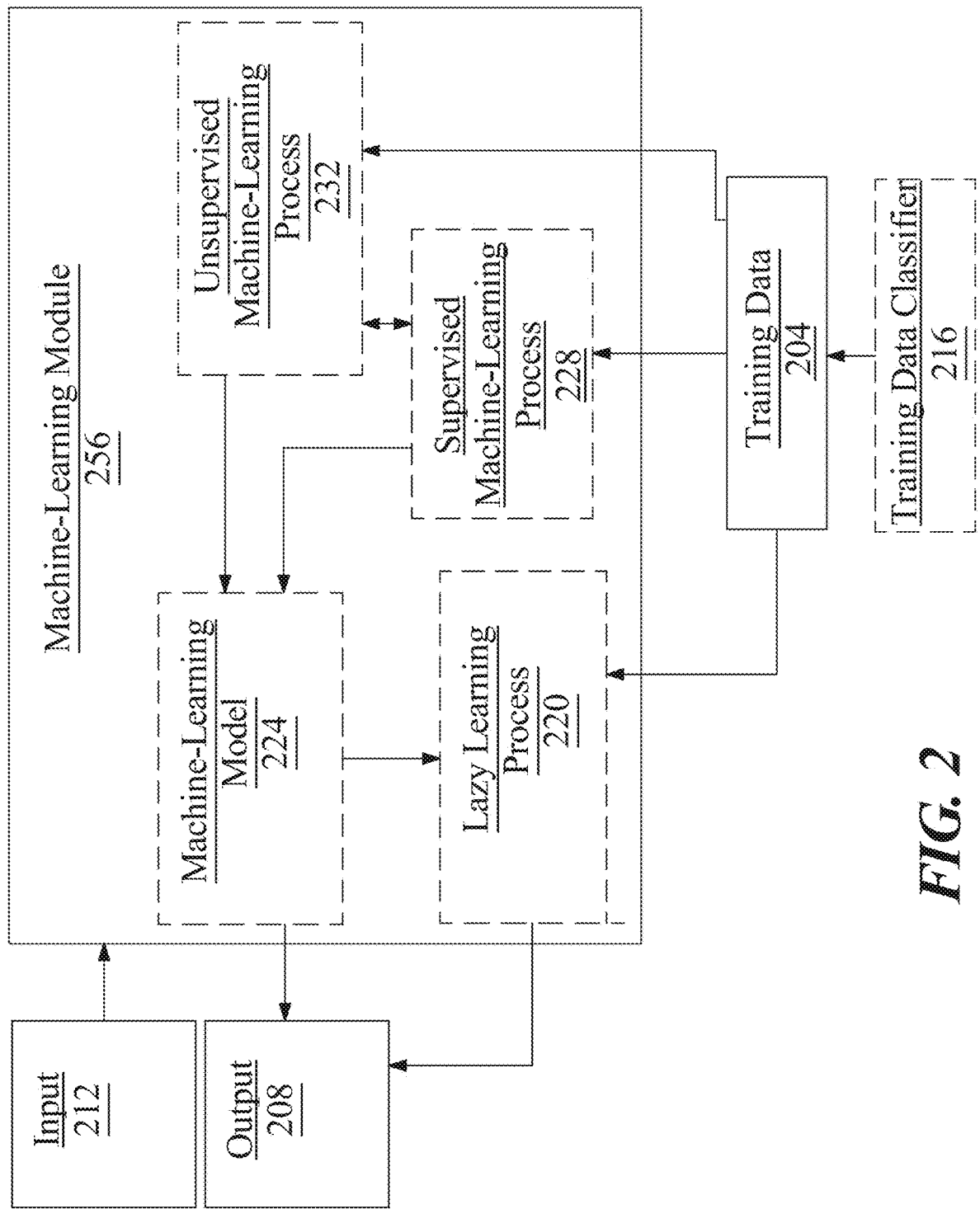
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
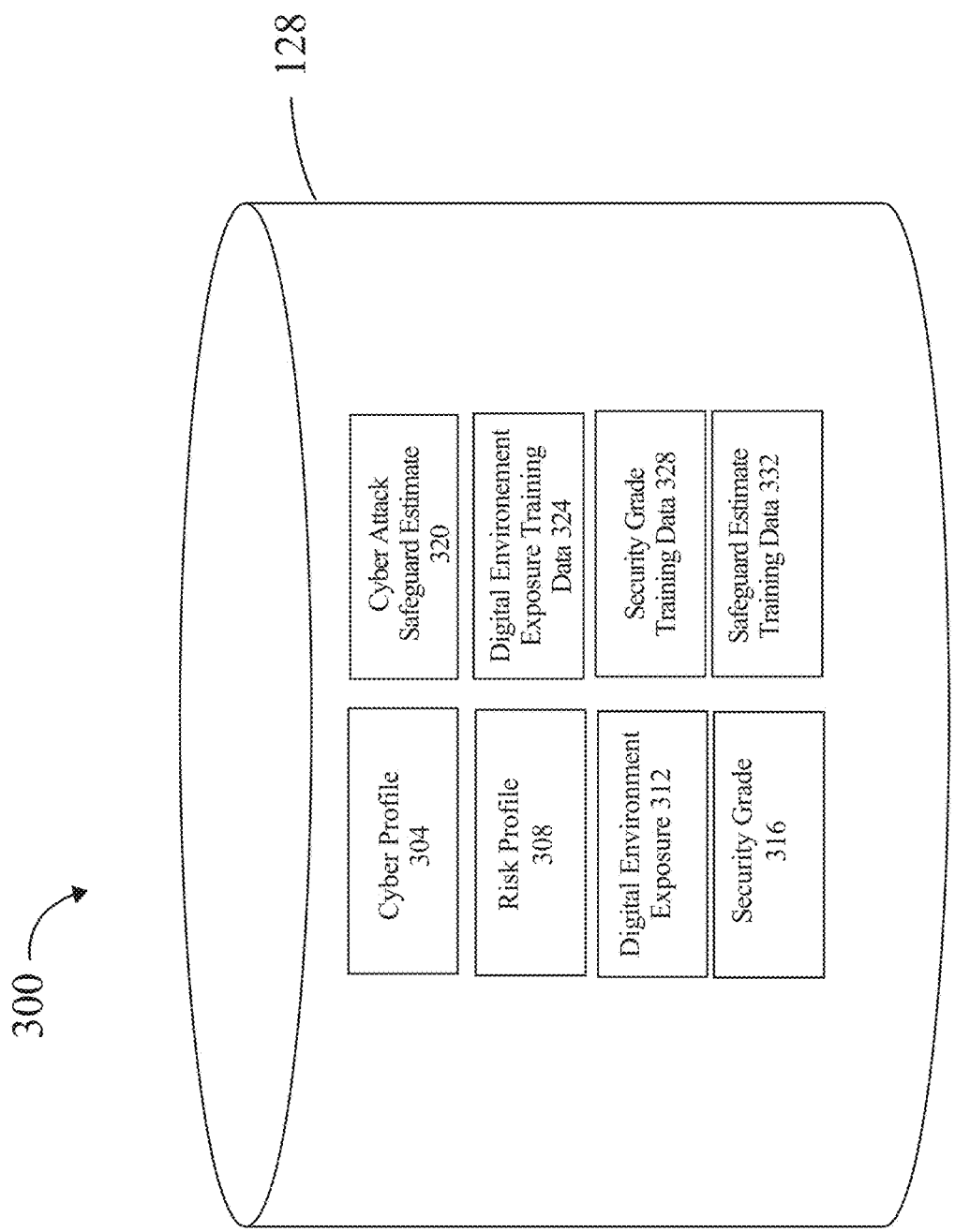
FIG. 3 is an exemplary embodiment of a database.

Now referencing FIG. 3, an exemplary embodiment 300 of database 132 is shown. Database 132 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 132 may alternatively or additionally be implemented using a distributed data storage protocol and/or data structure, such as a distributed hash table or the like. Database 132 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 132 may be used to store cyber profile 304, risk profile 308, digital environment exposure 312, security grade 316, cyber-attack safeguard quantifier 320, digital environment exposure training data 324, security grade training data 328, safeguard quantifier training data 332, and the like. Cyber profile 304 may be consistent with any cyber profiles as discussed above. Risk profile 308 may be consistent with any risk profile data as discussed herein. Digital environment exposure 312 may be consistent with any digital environment exposure as discussed herein. Security grade 316 may be consistent with any security grade as discussed herein. Cyber-attack safeguard quantifier 320 may be consistent with any cyber-attack safeguard quantifier as discussed herein. Digital environment exposure training data 324, security grade training data 328, and safeguard quantifier training data 332 may be consistent with any training data as discussed herein.

Figure 4:
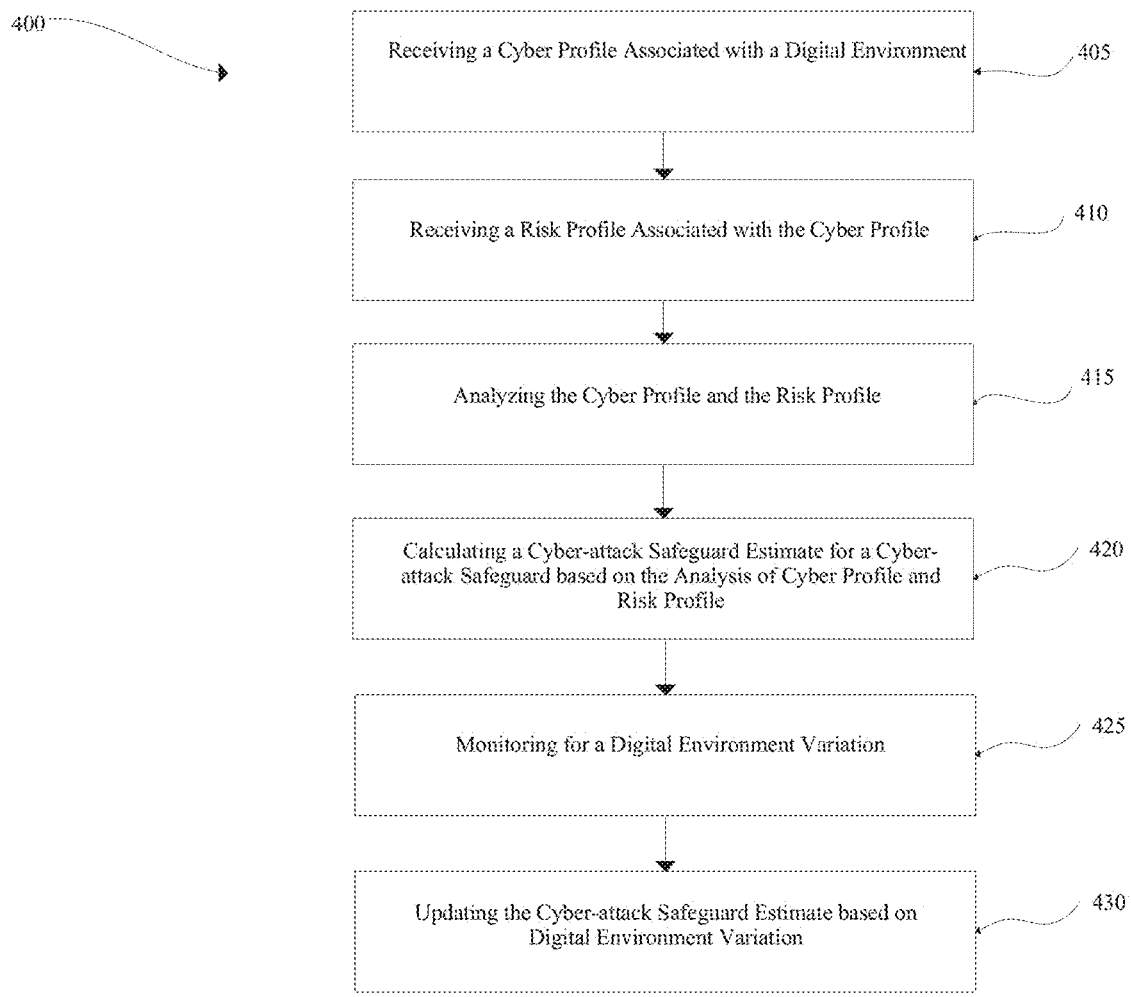
FIG. 4 is a flow diagram illustrating a method of determining a risk associated with a cyber-attack.

Referring now to FIG. 4, an exemplary embodiment of method 400 for updating cyber security support based on real time changes is shown. Step 405 of method 400 includes receiving, by a processor, a cyber profile associated with a digital environment. This may be implemented, without limitation, as described above in reference to FIGS. 1-3.

Still referring to FIG. 4, step 410 of method 400 includes receiving, by the processor, a risk profile associated with the cyber profile. This may be implemented, without limitation, as described above in reference to FIGS. 1-3.

With further reference to FIG. 4, step 415 of method 400 includes analyzing, by the processor, the cyber profile and the risk profile. This may be implemented, without limitation, as described above in reference to FIGS. 1-3.

Continuing to reference FIG. 4, step 420 of method 400 includes calculating, by the processor, a cyber-attack safeguard quantifier for a cyber-attack safeguard based on the analysis of the cyber profile and risk profile. This may be implemented, without limitation, as described above in reference to FIGS. 1-3.

Still referring to FIG. 4, step 425 of method 400 includes generate a user interface data structure including the cyber-attack safeguard quantifier. Further, method 400 may include detecting, by the processor, a cyber profile category digital environment variation and generating, by the processor, modified cyber profile category data based on the cyber profile category digital environment variation. Additionally, or alternatively, method 400 may include detecting, by the processor, a risk profile category digital environment variation and generating, by the processor, modified risk profile category data based on the cyber profile category digital environment variation This may be implemented, without limitation, as described above in reference to FIGS. 1-3.

Continuing to reference FIG. 4, the method 400 may include recalculating, by the processor, the cyber-attack safeguard quantifier based on the modified cyber profile category data. Additionally, or alternatively, the method 400 may also comprise recalculating, by the processor, the cyber-attack safeguard quantifier based on the modified risk profile category data. This may be implemented, without limitation, as described above in reference to FIGS. 1-3.

With further reference to FIG. 4, the method 400 may further include generating, by the processor, a security grade based on the cyber profile and the risk profile, detecting, by the processor, a digital environment variation, and updating, by the processor, the security grade based on the digital environment variation. Additionally, the method 400 may include recalculating, by the processor, the cyber-attack safeguard quantifier based on the updated security grade in the method 400. These may be implemented, without limitation, as described above in reference to FIGS. 1-3.

Still referring to FIG. 4, the method 400 may include generating at least one digital environment exposure based on the cyber profile and the risk profile, detecting a digital environment variation, and updating the at least one digital environment exposure based on the digital environment variation. Additionally, or alternatively, method 400 may include recalculating, by the processor, cyber-attack safeguard quantifier based on the updated at least one digital exposure. Further, the method 400 may include recalculating, by the processor, cyber-attack safeguard quantifier based on the updated at least one digital exposure as a function of a lookup table. These may be implemented, without limitation, as described above in reference to FIGS. 1-3.

Figure 5:
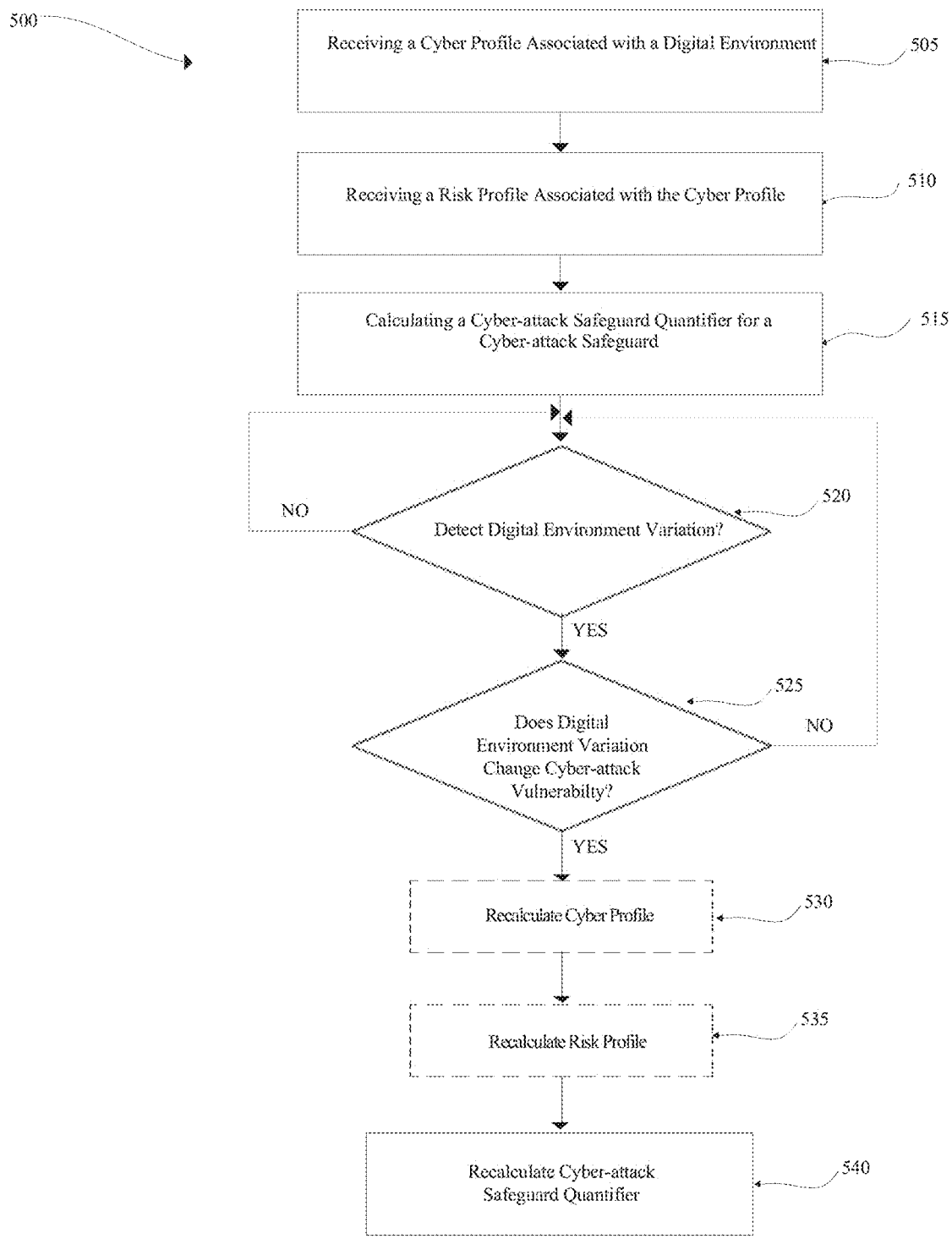
FIG. 5 is a flow diagram illustrating a method of calculating cyber-attack safeguard quantifier.

Referring now to FIG. 5, an exemplary method 500 for calculating cyber-attack safeguard quantifier is shown. Step 505 of method 500 includes receiving, by a processor, a cyber profile associated with a digital environment. This may be implemented, without limitation, as described above in reference to FIGS. 1-4.

Still referring to FIG. 5, step 510 of method 500 includes receiving, by the processor, a risk profile associated with the cyber profile. This may be implemented, without limitation, as described above in reference to FIGS. 1-4.

Continuing to reference FIG. 5, step 515 of method 500 includes calculating, by the processor, a cyber-attack safeguard quantifier for a cyber-attack safeguard based on the analysis of the cyber profile and risk profile. This may be implemented, without limitation, as described above in reference to FIGS. 1-4.

Continuing to reference FIG. 5, step 520 of method 500 includes detecting a digital environment variation. Digital environment variation may be any digital environment variation as described herein. If a digital environment is not detected, the method 500 continues step 520 until a digital environment variation is detected. When a digital environment variation is detected, the method 500 includes determining if digital environment variation is detected, the method 500 may include determining if digital environment variation changes cyber-attack vulnerability for digital environment 116. If digital environment variation does not change cyber-attack vulnerability for digital environment 116, the method 500 may include returning to step 520 until a further digital environment variation is detected. If digital environment variation changes cyber-attack vulnerability for digital environment 116, the method 500 may include recalculating cyber profile at step 530 and/or recalculating risk profile at step 535. Further, the method 500 may include recalculating cyber-attack safeguard quantifier based on digital environment variation and change in cyber-attack vulnerability. These may be implemented, without limitation, as described above in reference to FIGS. 1-4.

Figure 6:
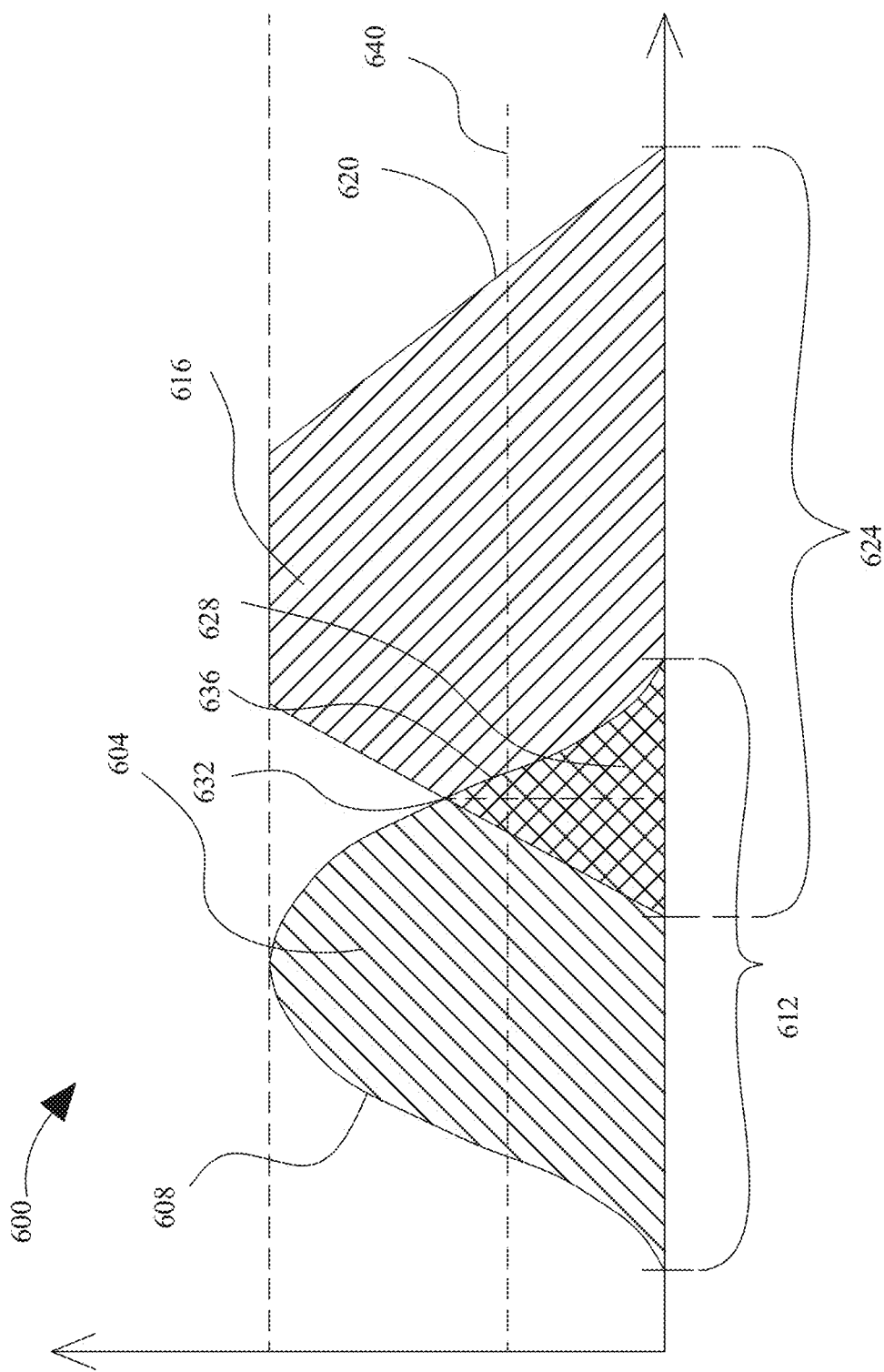
FIG. 6 is a schematic diagram illustrating an exemplary embodiment of a fuzzy inferencing system.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify data from the cyber profile and/or the risk profile with at least one corresponding recommended risk remediation action. For example, if digital asset profile data has a fuzzy set matching an update digital asset software fuzzy set by having a degree of overlap exceeding a threshold, computing device 104 may determine updating digital asset software as one of the at least one recommended risk remediation action. Where multiple fuzzy matches are performed, degrees of match for each respective fuzzy set may be computed and aggregated through, for instance, addition, averaging, or the like, to determine an overall degree of match.

Still referring to FIG. 6, in an embodiment, data from the cyber profile and/or the risk profile may be compared to multiple recommended risk remediation action fuzzy sets. For instance, a user data, as described above, may be represented by a fuzzy set that is compared to each of the multiple recommended risk remediation action fuzzy sets; and a degree of overlap exceeding a threshold between the user data fuzzy set and any of the multiple recommended risk remediation action fuzzy sets may cause computing device 104 to identify each of the recommended risk remediation actions as recommended risk remediation actions of the at least one recommended risk remediation actions. For instance, in one embodiment there may be two risk remediation action fuzzy sets, representing respectively increasing user restriction data and increasing user account authentication data. A number of user accounts data may have a first fuzzy set; user account restriction data may have a second fuzzy set; and user data may have a user data fuzzy set. Processor 104, for example, may compare a user data fuzzy set with each of increasing user restriction data fuzzy set and increasing user account authentication fuzzy set, as described above, and identify either, both, or neither of increasing user restriction data and increasing user account authentication as at least one recommended risk remediation action to user data. Machine-learning methods as described throughout may, in a non-limiting example, generate coefficients used in fuzzy set equations as described above, such as without limitation x, c, and σ of a Gaussian set as described above, as outputs of machine-learning methods. Likewise, user response may be used indirectly to determine a fuzzy set, as user response fuzzy set may be derived from outputs of one or more machine-learning models that take the user response directly or indirectly as inputs.

Still referring to FIG. 6, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of recommended risk remediation action as calculated using any statistical, machine-learning, or other method that may occur to a person skilled in the art upon reviewing the entirety of this disclosure. In other words, a given element of cyber profile and/or risk profile may have a first non-zero value for membership in a first linguistic variable value such as a recommended risk remediation action and a second non-zero value for membership in a second linguistic variable value such as degree of urgency. In some embodiments, determining a recommend risk remediation action may include using a linear regression model. A linear regression model may include a machine learning model. A linear regression model may be configured to map data of cyber profile and/or risk profile to one or more recommended risk remediation actions and degrees of urgency. A linear regression model may be trained using training data as discussed above. In some embodiments, determining a recommended risk remediation action may include using a recommended risk remediation action classification model. A recommended risk remediation action classification model may be configured to input collected data and cluster data to a centroid based on, but not limited to, frequency of appearance, and the like. Centroids may include compatibility scores assigned to them such that each cyber profile and risk profile may each be assigned a compatibility score. In some embodiments, a urgency classification model may include a K-means clustering model. In some embodiments, an urgency classification model may include a particle swarm optimization model. In some embodiments, determining a compatibility score of user response may user response using a fuzzy inference engine. A fuzzy inference engine may be configured to map one or more data elements using fuzzy logic. In some embodiments, a plurality of recommended risk remediation action may be arranged by a logic comparison program into compatibility score arrangements. An "compatibility score arrangement" as used in this disclosure is any grouping of objects and/or data based on degree of match for recommended risk remediation action. This step may be implemented as described above in FIGS. 1-2. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. Continuing the example, an output linguistic variable may represent, without limitation, increasing a firewall setting level. An inference engine may combine rules, such as: "if the firewall level is 'low' and the exposure level is 'high', the security baseline is 'low'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
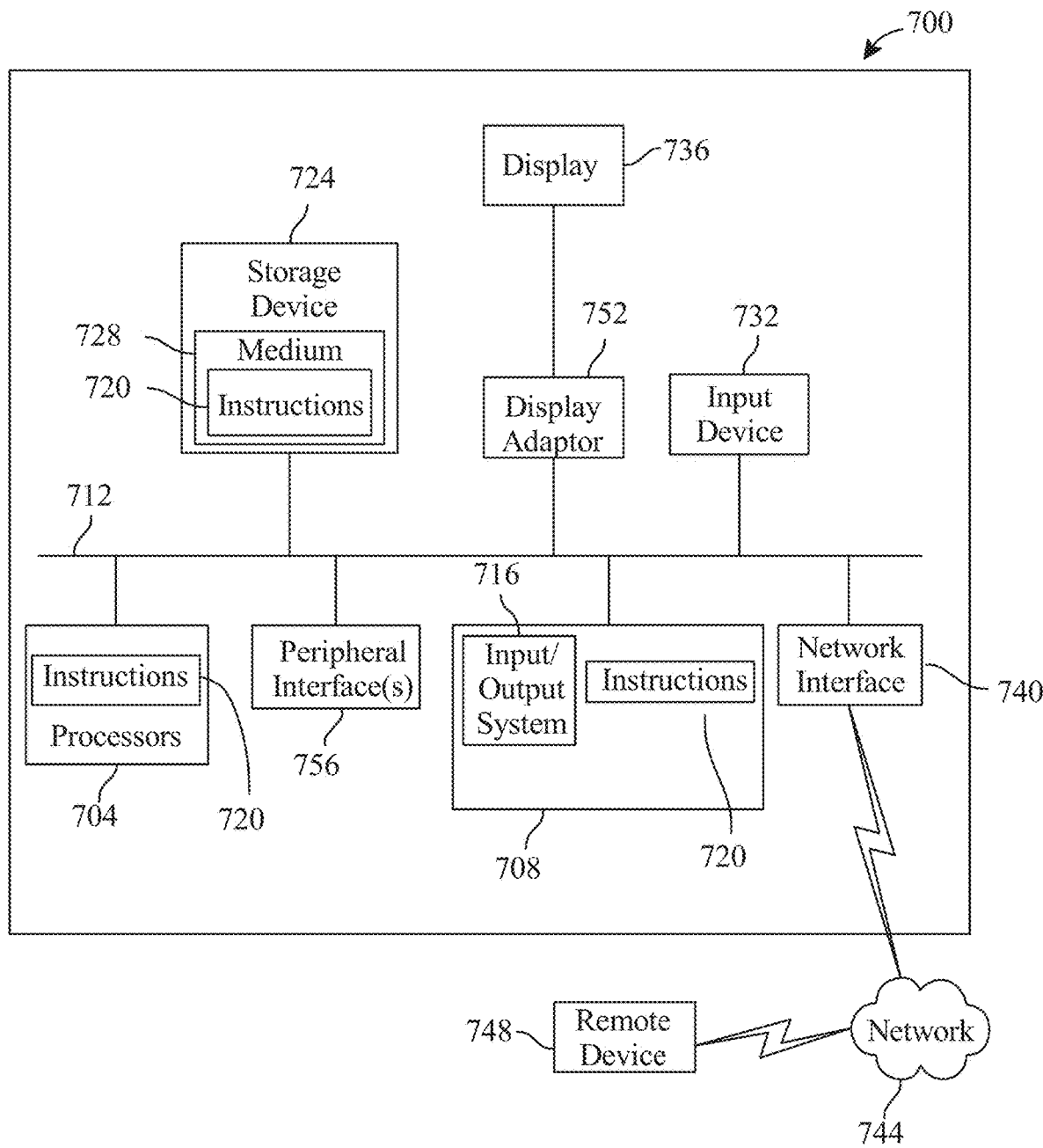
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for updating risk determination based on real-time changes in cyber security risk, the apparatus comprising:
   at least a processor; and
   a memory communicatively coupled to the at least a processor, the memory comprising instructions configuring the at least a processor to:
   receive a cyber profile associated with a digital environment;
   receive a risk profile associated with the cyber profile;
   detect a digital environment variation related to a risk profile category;
   generate modified risk profile category data based on the digital environment variation;
   analyze the cyber profile and the risk profile;
   generate a cyber-attack safeguard quantifier for a cyber-attack safeguard based on the analysis of the cyber profile and risk profile;
   determine a correlation between the risk profile and a corresponding historical safeguard quantifier representing an operational continuity of the digital environment;
   generate a user interface data structure including the cyber-attack safeguard quantifier; and
   recalculating the cyber-attack safeguard quantifier based on the updated at least one digital exposure as a function of a lookup table.

2. The apparatus of claim 1, further comprising:
   detecting a cyber profile category digital environment variation; and
   generating modified cyber profile category data based on the cyber profile category digital environment variation.

3. The apparatus of claim 2, further comprising recalculating the cyber-attack safeguard quantifier based on the modified cyber profile category data.

4. The apparatus of claim 1, further comprising recalculating the cyber-attack safeguard estimate based on the modified risk profile category data.

5. The apparatus of claim 1, wherein the memory further comprises instructions configuring the at least a processor to:
   generate a security grade based on the cyber profile and the risk profile; and
   update the security grade based on the digital environment variation.

6. The apparatus of claim 5, wherein updating the cyber-attack safeguard quantifier comprises recalculating the cyber-attack safeguard quantifier based on the updated security grade.

7. The apparatus of claim 1, wherein the memory further comprises instructions configuring the at least a processor to:
   generate at least one digital environment exposure based on the cyber profile and the risk profile; and
   update the at least one digital environment exposure based on the digital environment variation.

8. The apparatus of claim 7, further comprising recalculating the cyber-attack safeguard quantifier based on the updated at least one digital exposure.

9. A method for updating risk determination based on real-time changes in cyber security risk comprising:
   receiving, by a processor, a cyber profile associated with a digital environment;
   receiving, by the processor, a risk profile associated with the cyber profile;
   detecting, by the processor, a digital environment variation related to a risk profile category;
   generating, by the processor, modified risk profile category data based on the digital environment variation;
   analyzing, by the processor, the cyber profile and the risk profile;
   calculating, by the processor, a cyber-attack safeguard quantifier for a cyber-attack safeguard based on the analysis of the cyber profile and risk profile;
   monitoring, by the processor, for the digital environment variation;
   determining, by the processor, a correlation between the risk profile and a corresponding historical safeguard quantifier representing an operational continuity of the digital environment;
   updating, by the processor, the cyber-attack safeguard quantifier based on the digital environment variation and the correlation; and
   recalculating, by the processor, the cyber-attack safeguard quantifier based on the updated at least one digital exposure as a function of a lookup table.

10. The method of claim 9, further comprising:
    detecting, by the processor, a cyber profile category digital environment variation; and
    generating, by the processor, modified cyber profile category data based on the cyber profile category digital environment variation.

11. The method of claim 10, further comprising recalculating, by the processor, the cyber-attack safeguard quantifier based on the modified cyber profile category data.

12. The method of claim 9, further comprising recalculating, by the processor, the cyber-attack safeguard quantifier based on the modified risk profile category data.

13. The method of claim 9, further comprising:
    generating, by the processor, a security grade based on the cyber profile and the risk profile; and
    updating, by the processor, the security grade based on the digital environment variation.

14. The method of claim 13, wherein updating the cyber-attack safeguard quantifier comprises recalculating, by the processor, the cyber-attack safeguard quantifier based on the updated security grade.

15. The method of claim 9, further comprising:
    generating, by the processor, at least one digital environment exposure based on the cyber profile and the risk profile; and
    updating, by the processor, the at least one digital environment exposure based on the digital environment variation.

16. The method of claim 15, further comprising recalculating, by the processor, the cyber-attack safeguard quantifier based on the updated at least one digital exposure.

* * * * *